US009055477B2

(12) United States Patent
Gupta

(10) Patent No.: US 9,055,477 B2
(45) Date of Patent: Jun. 9, 2015

(54) HANDLING WAIT TIME IN A CONGESTED WIRELESS COMMUNICATION NETWORK

(75) Inventor: Vivek Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/526,302

(22) Filed: Jun. 18, 2012

(65) Prior Publication Data

US 2013/0201823 A1    Aug. 8, 2013

Related U.S. Application Data

(60) Provisional application No. 61/595,576, filed on Feb. 6, 2012.

(51) Int. Cl.
| | |
|---|---|
| *H04W 28/10* | (2009.01) |
| *H04W 24/10* | (2009.01) |
| *H04W 48/06* | (2009.01) |
| *H04W 28/12* | (2009.01) |
| *H04B 7/02* | (2006.01) |

(Continued)

(52) U.S. Cl.
CPC .............. *H04W 24/10* (2013.01); *H04W 48/06* (2013.01); *H04W 28/12* (2013.01); *H04W 4/005* (2013.01); *H04B 7/024* (2013.01); *H04W 76/027* (2013.01); *H04W 76/066* (2013.01)

(58) Field of Classification Search
CPC ..... H04W 28/12; H04W 48/06; H04W 4/005; H04W 72/12; H04W 76/02
USPC ....................................................... 370/230
See application file for complete search history.

(56) References Cited

U.S. PATENT DOCUMENTS

2003/0145095 A1*  7/2003  Liu et al. ........................ 709/230
2004/0203778 A1*  10/2004  Kuo et al. ...................... 455/436

(Continued)

FOREIGN PATENT DOCUMENTS

EP           0994634 A2    4/2000
WO     WO2004/043092 A1    5/2004

OTHER PUBLICATIONS

3GPP, "Technical Specification Group Core Network and Terminals; Non-Access-Stratum (NAS) protocol for Evolved Packet System (EPS); Stage 3 (Release 10)," 3GPP TS 24.301 v10.5.0, Dec. 20, 2011, pp. 53, 83-84, 114-116, 135-138.

(Continued)

*Primary Examiner* — Charles C Jiang
*Assistant Examiner* — Thad Defauw
(74) *Attorney, Agent, or Firm* — Schwabe, Williamson & Wyatt, P.C.

(57) ABSTRACT

Embodiments of the present disclosure describe techniques and configurations for handling a wait time in a wireless communication network when the network is determined to be congested. An apparatus may include computer-readable media having instructions and one or more processors coupled with the computer-readable media and configured to execute the instructions to send a radio resource control request message to a wireless network controller, receive a response message including an extended wait time value, determine upon receipt of the response message whether a back-off timer associated with the apparatus is running, and determine whether to start the backoff timer with the received extended wait time value based at least in part on the determination of whether the back-off timer is running and the received wait time value is integrity protected.

17 Claims, 5 Drawing Sheets

(51) Int. Cl.
*H04W 76/02* (2009.01)
*H04W 4/00* (2009.01)
*H04W 76/06* (2009.01)

(56) References Cited

U.S. PATENT DOCUMENTS

| | | | |
|---|---|---|---|
| 2008/0056226 A1* | 3/2008 | Zhao et al. | 370/342 |
| 2009/0247176 A1 | 10/2009 | Song et al. | |
| 2010/0034171 A1 | 2/2010 | Pelletier et al. | |
| 2010/0099402 A1* | 4/2010 | Wu | 455/423 |
| 2010/0144316 A1 | 6/2010 | Piercy et al. | |
| 2010/0202307 A1 | 8/2010 | Lee et al. | |
| 2011/0274040 A1* | 11/2011 | Pani et al. | 370/328 |
| 2011/0287765 A1* | 11/2011 | Russell et al. | 455/435.1 |
| 2012/0263036 A1* | 10/2012 | Barclay et al. | 370/230 |

OTHER PUBLICATIONS

3GPP, "Technical Specification Group Core Network and Terminals; Mobile radio interface Layer 3 specification; Core network protocols; Stage 3 (Release 10)," 3GPP TS 24.008 v10.5.0, Dec. 20, 2011, pp. 98-100, 105-107, 115, 124, 137-139, 169-171, 208-209.
3GPP TS 23.060 (V10.2.0), "General Packet Radio Service (GPRS); Service description: Stage 2 (Release 10)," Dec. 31, 2010.
International Search Report and Written Opinion for International Application No. PCT/US2013/024795, mailed Jun. 2, 2013.
BE Search Report for BE Application No. 201300080, dated Dec. 5, 2013, 8 pages.
NL Search Report for NL Application No. 2010250, dated Dec. 6, 2013, 5 pages.
Rahul Vaidya et al: "Network congestion control: mechanisms for congestion avoidance and recovery", ACWR '11 Proceedings of the 1st International Conference on Wireless Technologies for Humanitarian Relief, Nov. 1, 2011, bladzijden 199-207, XP055078319, para 4.3 et 4.4.
3GPP TS 23.060, 3rd Generation Partnership Project (3GPP), Technical Specification Group Services and System Aspects; General Packet Radio Service (GPRS); Stage 2 (Release 10), 3GPP Standard; Mobile Competence Centre; 650, Route Des Lucioles; F-06921 Sophia-Antipolis Cedex; France, nr. VI0.2.0, (Dec. 20, 2010), bladzijden 27-28, XP002717479, para 5.3.6.2.2.
Office Action issued Oct. 1, 2014 from Finnish Patent Application No. 20135109.
Notification Concerning Transmittal of International Preliminary Report on Patentability mailed Aug. 21, 2014 from International Application No. PCT/US2013/024795.
Office Action issued Jun. 13, 2014 from Swedish Patent Application No. 1300090-6.
Office Action issued Jul. 3, 2014 from Spanish Patent Application No. P201330137 (Google translated).
Renesas Mobile Europe, "UE processing of extended wait timer received unexpectedly," 3GPP TSG CT WG1 Meeting #76, C1-120082, Agenda Item: 11.23.2, Feb. 6-10, 2012, Xiamen (P.R. China), 5 pages.

* cited by examiner

… (1)

HANDLING WAIT TIME IN A CONGESTED WIRELESS COMMUNICATION NETWORK

CROSS REFERENCE TO RELATED APPLICATIONS

The present application claims priority to U.S. Provisional Patent Application No. 61/595,576, filed Feb. 6, 2012, entitled "Advanced Wireless Communication Systems and Techniques," which is hereby incorporated by reference in its entirety for all purposes.

FIELD

Embodiments of the present disclosure generally relate to the field of wireless communication systems, and more particularly, to techniques and configurations for handling congestion in wireless communication networks.

BACKGROUND

Interactions between wireless devices and wireless communication networks in which the devices operate may be conducted according to a particular set of rules or protocols configured to handle such interactions. A wireless device, such as a machine-to-machine device, may send a communication (e.g., a request to connect) to a network in order to establish a connection allowing the device to communicate messages (e.g., data) to another device or machine through the network. In some instances, the network may be overloaded (e.g., "congested") and may refuse the device request. The network then may provide a wait time value to the device, during which the device may not be allowed to reconnect with the network. However, in some instances the wait time value may be provided without a necessary security protection or may conflict with another wait time value that may have been provided to the device prior to the communication submitted by the device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
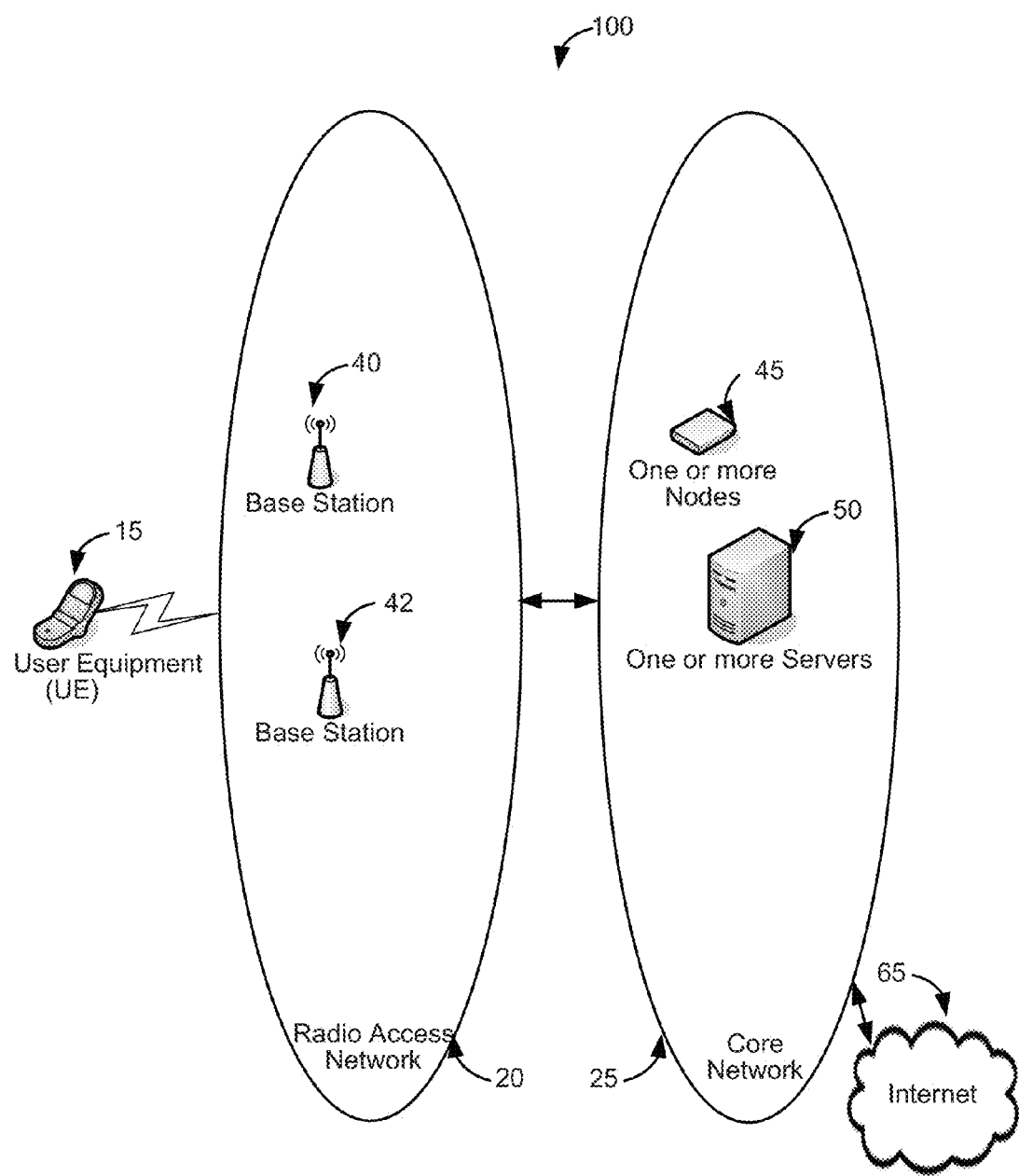
FIG. 1 illustrates an example wireless communication network in accordance with some embodiments.

Embodiments of the present disclosure provide data techniques and configurations in a wireless communication network including techniques and configurations for handling wait time in a congested wireless communication network. In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application-Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Example embodiments may be described herein in relation to wireless communication networks including networks such as $3^{rd}$ Generation Partnership Project (3GPP) Long-Term Evolution (LTE) networks including any amendments, updates, and/or revisions (e.g., LTE Release 10 (also referred to as LTE-Advanced (LTE-A), LTE Release 11, etc.), Worldwide Interoperability for Microwave Access (WiMAX) networks, and the like. The embodiments described herein may operate in relation to a radio access network, e.g., an evolved Universal Terrestrial Radio Access Network (E-UTRAN) having evolved node base stations (eNBs), and a core network, e.g., an evolved packet core having gateways, management entities, etc.

In other embodiments, communication schemes described herein may be compatible with additional/alternative communication standards, specifications, and/or protocols. For example, embodiments of the present disclosure may be applied to other types of wireless networks where similar advantages may be obtained. Such networks may include, but are not limited to, wireless local area networks (WLANs), wireless personal area networks (WPANs) and/or wireless wide area networks (WWANs) such as cellular networks and the like.

The following embodiments may be used in a variety of applications including transmitters and receivers of a mobile wireless radio system. Radio systems specifically included within the scope of the embodiments include, but are not limited to, network interface cards (NICs), network adaptors, base stations, access points (APs), relay nodes, eNBs, gateways, bridges, hubs and satellite radiotelephones. Further, the radio systems within the scope of embodiments may include satellite systems, personal communication systems (PCS), two-way radio systems, global positioning systems (GPS), two-way pagers, personal computers (PCs) and related peripherals, personal digital assistants (PDAs), personal computing accessories and all existing and future arising systems which may be related in nature and to which the principles of the embodiments could be suitably applied.

Techniques described herein provide for handling various types of communications, such as connection and other requests, between a UE and a network controller in a wireless network environment, wherein the network may be congested and may not immediately accept a request or other communication from the UE. If the network is determined to be congested and therefore unable to process a request from the UE, the network may provide to the UE a wait time value, during which the UE may refrain from attempting to contact or connect to the network. Handling of the provided wait time values by UE in different situations is described below in greater detail.

FIG. 1 schematically illustrates an example wireless network 100 in accordance with some embodiments. The network 100 may include a RAN 20 and a core network 25. In some embodiments, the network 100 may be an LTE network, the RAN 20 may be a E-UTRAN, and the core network 25 may be an evolved core network such as EPS (Evolved Packet System). A UE 15 may access the core network 25 via a radio link ("link") with an eNB such as, for example, one of eNBs 40, 42, etc., in the RAN 20. The UE 15 may be, for example, a subscriber station (e.g., a mobile device) that is configured to communicate with the eNBs 40, 42 in conformance with one or more protocols. The following description is provided for an example network 100 that conforms with 3GPP for ease of discussion; however, subject matter of the present disclosure is not limited in this regard and the described embodiments may apply to other networks that benefit from the principles described herein. In some embodiments, the UE 15 may be configured to communicate using a multiple-input and multiple-output (MIMO) communication scheme. One or more antennas of the UE 15 may be used to concurrently utilize radio resources of multiple respective component carriers (e.g., which may correspond with antennas of eNBs 40, 42) of RAN 20. The UE 15 may be configured to communicate using Orthogonal Frequency Division Multiple Access (OFDMA) in, e.g., downlink communications, and/or Single-Carrier Frequency Division Multiple Access (SC-FDMA) in, e.g., uplink communications in some embodiments.

While FIG. 1 generally depicts the UE 15 as a mobile device (e.g., a cellular phone), in various embodiments the UE 15 may be a personal computer (PC), a notebook, ultra-book, netbook, smartphone, an ultra mobile PC (UMPC), a handheld mobile device, an universal integrated circuit card (UICC), a personal digital assistant (PDA), a Customer Premise Equipment (CPE), a tablet, or other consumer electronics such as MP3 players, digital cameras, and the like. In an embodiment, the UE 15 may be a Machine Type Communication (MTC) device, also known as machine-to-machine device. In the present disclosure, the terms UE and mobile device will be used interchangeably for simplicity purposes. The eNBs 40, 42 may include one or more antennas, one or more radio modules to modulate and/or demodulate signals transmitted or received on an air interface, and one or more digital modules to process signals transmitted and received on the air interface.

In some embodiments, communication with the UE 15 via RAN 20 may be facilitated via one or more nodes 45 (e.g., Radio Network Controllers). The one or more nodes 45 may act as an interface between the core network 25 and the RAN 20. According to various embodiments, the one or more nodes 45 may include a Mobile Management Entity (MME) that is configured to manage signaling exchanges (e.g., authentication of the UE 15 and NAS (non-access stratum) messages) between the base stations 40, 42 and the core network 25 (e.g., one or more servers 50), a Packet Data Network Gateway (PGW) to provide a gateway router to the Internet 65, and/or a Serving Gateway (SGW) to manage user data tunnels or paths between the eNBs 40, 42 of the RAN 20 and the PGW. Other types of nodes may be used in other embodiments.

The core network 25 may include logic (e.g., a module) to provide authentication of the UE 15 or other actions associated with establishment of a communication link to provide a connected state of the UE 15 with the network 100. For example, the core network 25 may include one or more servers 50 that may be communicatively coupled to the base stations 40, 42. In an embodiment, the one or more servers 50 may include a Home Subscriber Server (HSS), which may be used to manage user parameters such as a user's International Mobile Subscriber Identity (IMSI), authentication information, and the like. The core network 25 may include other servers, interfaces, and modules. In some embodiments, logic associated with different functionalities of the one or more servers 50 may be combined to reduce a number of servers, including, for example, being combined in a single machine or module.

According to various embodiments, the network 100 may be an Internet Protocol (IP) based network. For example, the core network 25 may be, at least in part, an IP based network, such as a packet switched (PS) network. Interfaces between network nodes (e.g., the one or more nodes 45) may be based on IP, including a backhaul connection to the base stations 40, 42. In some embodiments, the network may be enabled to provide connection with a circuit switched (CS) network (e.g., CS domain). In an embodiment, a UE may communicate with the network according to one or more communication protocols, such as, for example, Radio Resource Control (RRC) protocol adapted for LTE communication environment.

Figure 2:
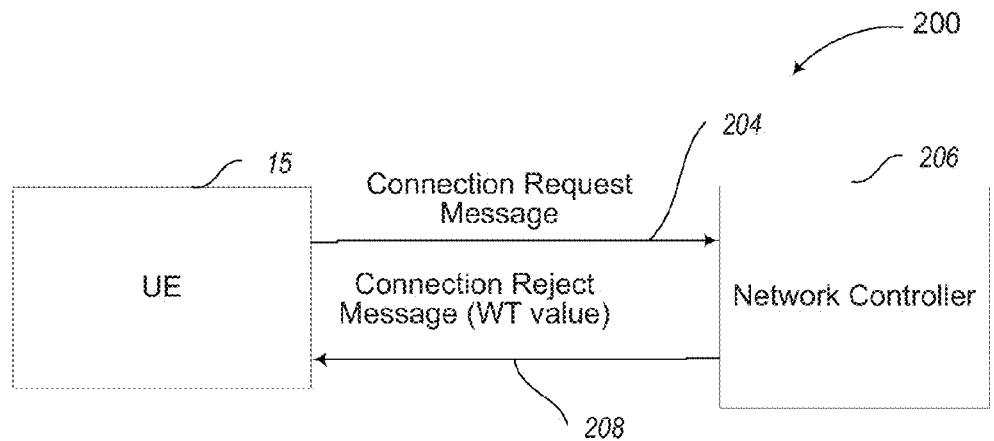
FIGS. 2 and 3 are block diagrams illustrating example communications between user equipment (mobile device) and a wireless communication network in accordance with some embodiments.

An example connection diagram between the UE 15 and the network 100 is illustrated in FIG. 2. As the diagram 200 illustrates, the UE 15 may send an RRC connection request message 204 to a network controller 206. The RRC connection request message 204 may be a request by the UE 15 for allocation of radio resources so that the UE 15 may transfer data with the RAN 20. The network controller 206 may control establishment and/or maintenance of RRC connections between the UE and the RAN 20. The network controller 206 may be disposed in an eNB 40 or 42 with which the UE 15 attempts to establish an RRC connection. In other embodiments, the network controller 206, or components thereof, may be disposed in additional/alternative network entities, e.g., within a node of the one or more nodes 45, a server of the one or more servers 50, etc.

If the RAN 20 is congested and is not be able to support an RRC connection associated with the RRC connection request 204, the network controller 206 may respond with an RRC connection reject message 208 to reject the RRC connection request 204. In this case an RRC connection between the UE 15 and the RAN 20 may not be established.

In some instances, for particular types of devices, such as MTC devices, the network controller 206 may provide, in the connection reject message 208, a wait time (WT) value also known as extended wait time or EWT. (For simplicity purposes, the terms "extended wait time value," "wait time value," and "wait time" will be used herein interchangeably.)

A timer associated with the device (known as a "backoff timer") may start running for the duration of the wait time and may keep the device "on hold," i.e., refraining from sending communications to the network, until the wait time expires and the device may be allowed to resend the request to the network (or re-establish a connection with the device). However, the wait time value provided by the network controller 206 may be received by the UE 15 without a security protection as the security communication mode has not been set up.

Figure 3:
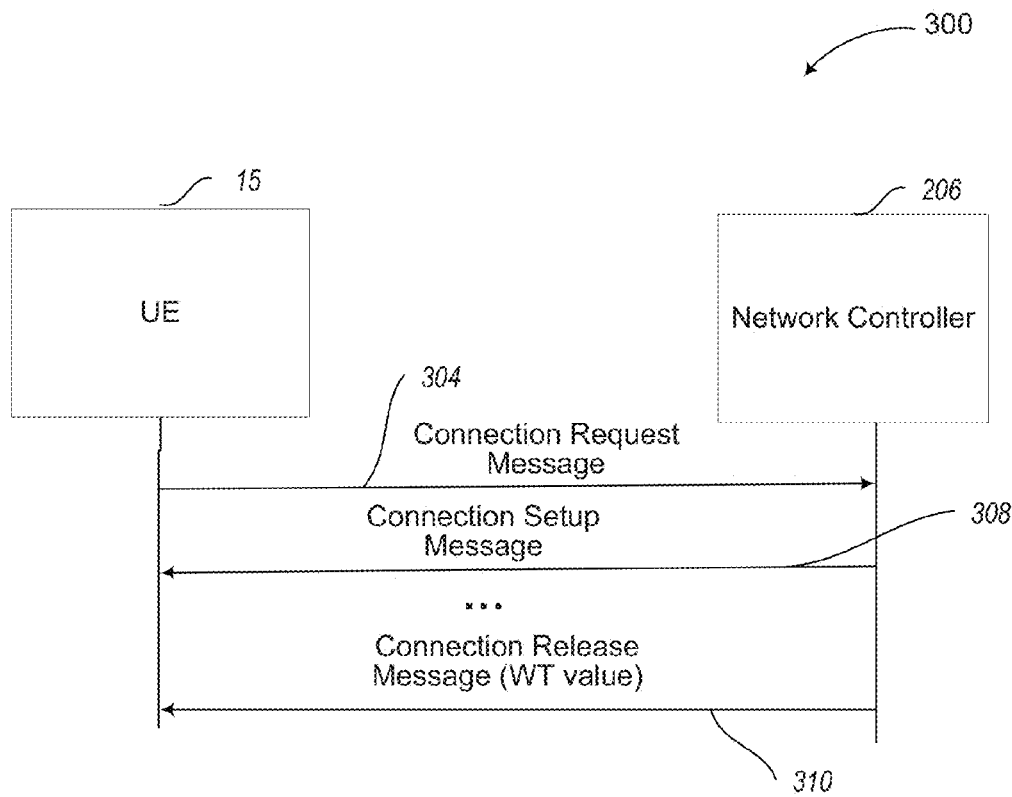

A wait time value may be provided to the device (UE) in other instances. FIG. 3 is a block diagram 300 illustrating an instance where the UE 15 may initiate a connection request by sending an RRC connection request message 304 to the network controller 206. The network controller 206 in this instance may determine that the RAN 20 may be able to support an RRC connection associated the RRC connection request 304. Accordingly, the network controller 206 may respond with a connection setup message 308. A number of other "hand-shaking" messages (not shown) may be transmitted between the UE 15 and the network controller 206 in accordance with an adapted communication protocol. For example, the UE 15 may respond to the connection setup message 308 with a notification that a connection setup is complete; the network controller 306 may issue a security mode establishment command; the UE 15 may notify the network controller 306 that the security mode has been established. In one embodiment, the network controller 306 may provide an RRC connection release message 310 that may include a wait time value. In an instance when the RRC Connection Release takes place immediately after RRC connection establishment, there may be no time for security mode setting. Accordingly, the wait time may be received in an unsecured mode.

In summary, when the network is congested, the network controller 206 may specify an extended wait time and ask the UE 15 to "back off" for the duration of the wait time. As discussed, this may happen during connection establishment or during other types of communication between the UE 15 and the network (e.g., RRC signaling) when the network controller 206 determines that the network (e.g., RAN 20) is congested. This may also happen during RRC connection release when the network controller 206 determines that the network (e.g., RAN 20) is congested and UE 15 should "back off" for all future requests.

The extended wait time may also need to be handled for other types of communications, e.g., during messaging associated with the Non-Access Stratum (NAS) functionality that supports the mobility of the UE 15 and the session management procedures to establish and maintain IP connectivity between the UE 15 and external packet data networks. As discussed, in some cases the extended wait time may be received with security protection while in other cases it may be received without security protection. Furthermore, the extended wait time may be received by the UE 15 (e.g., in RRC reject message or connection release message) when a backoff timer may already be running on the device. The disclosed techniques provide for handling of the wait time by a mobile device in the above situations.

Figure 4:
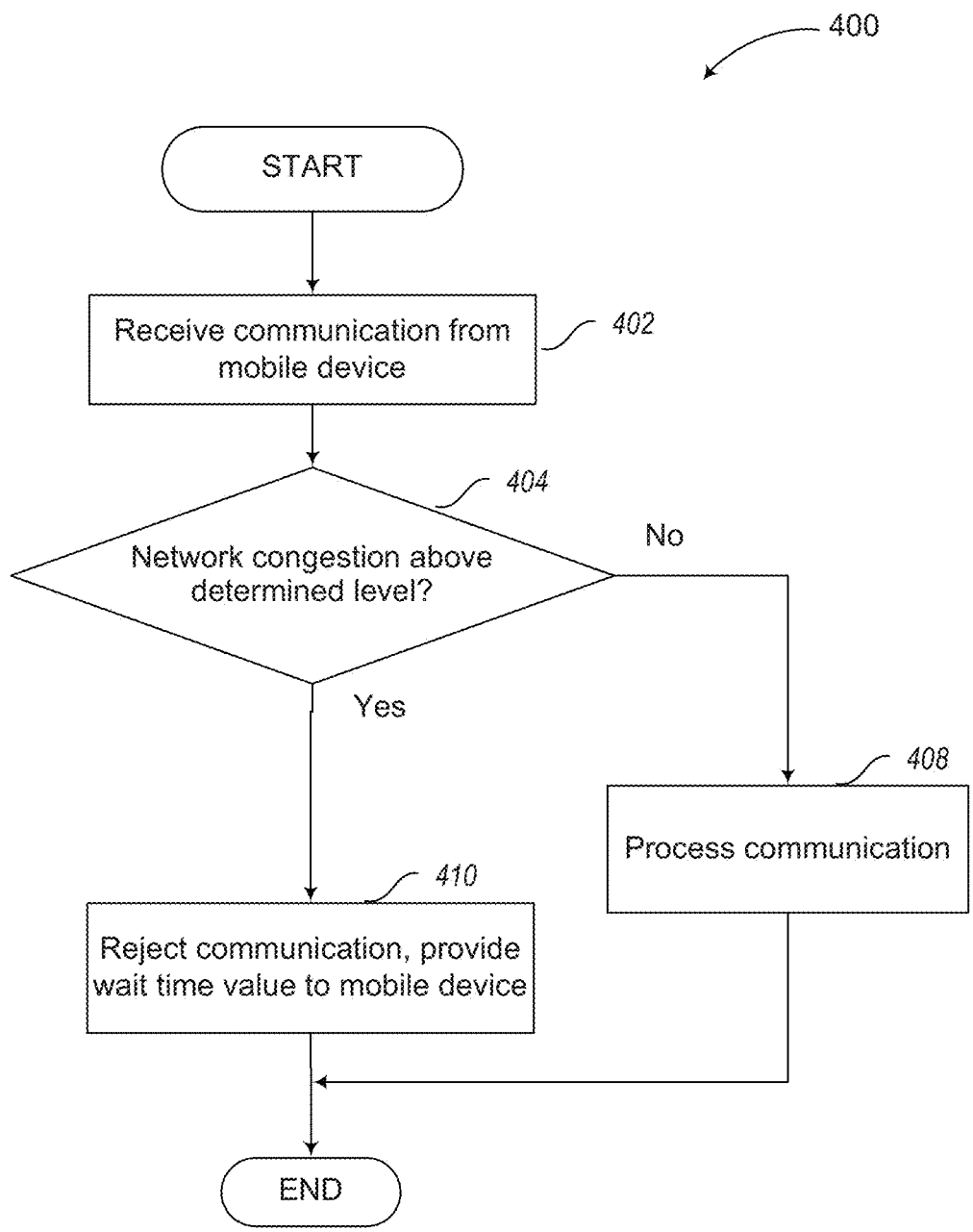
FIG. 4 is a process flow diagram for communications between a network server and user equipment in a wireless communication network in accordance with some embodiments.

FIG. 4 is a process flow diagram illustrating communications between a network controller, e.g., network controller 206, and a UE, e.g., UE 15, in a wireless network environment in accordance with an embodiment. The process 400 begins at block 402, where a connection request from the UE may be received by the network controller. As discussed above, there may be different types of communications initiated by the mobile device, such as, for example, an RRC Connection Request. At decision block 404 it may be determined, e.g., by the network controller, whether the network is congested above a certain determined level that allows establishing a connection with the device. Network congestion may be based on one or more congestion characteristics such as, but not limited to, effective bandwidth throughput, loss, delay, choke, and/or other known characteristics. If it is determined that the network congestion is below the determined level, at block 408 the connection of the UE is accepted. If it is determined that the network congestion and/or overloading is above the determined level, at block 410 the network controller may reject the connection (e.g., the network controller may send the RRC Connection Reject message described above) along with a wait time value.

Figure 5:
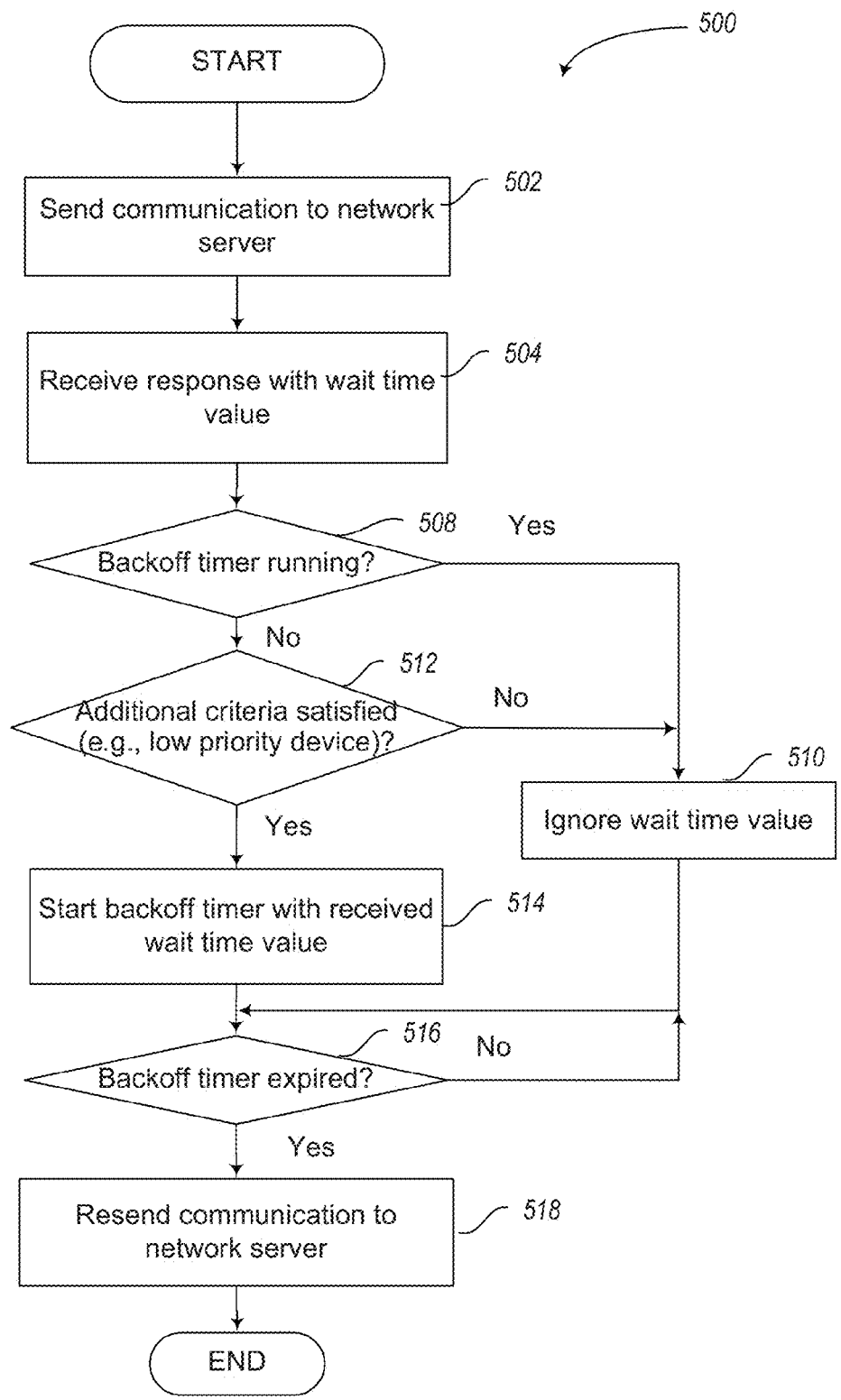
FIG. 5 is a process flow diagram for handling a wait time provided to a mobile device in a congested wireless network environment in accordance with some embodiments.

FIG. 5 is a process flow diagram illustrating handling a wait time provided to a UE, e.g., UE 15, in a congested wireless network environment in accordance with an embodiment. The process 500 begins at block 502, where a communication may be sent to a network controller, e.g., network controller 206. As discussed above, the communication may be any type of request, such as RRC Connection Request.

At block 504, a response from the network controller may be received by the UE. In one example, if the network is congested, the response may include a rejection to the request to connect (e.g., RRC connection reject message) that may include a wait time value generated by the network controller for the UE. Other types of communications between the UE and the network controller may include the NAS connection release instances discussed in reference to FIG. 3 or other "abnormal" cases resulting from unexpectedly receiving a wait time value from the network controller. For example, in the instance of the NAS signaling connection discussed above, the UE may receive the extended wait time value from the network with the RRC connection release message. In other examples, the extended wait time value may be included in the network response to an attach request message, tracking area update request message, location updating request message, routing area update request message, or service request message provided by the UE.

At decision block 508 it may be determined whether a back-off timer associated with the UE is running. This situation may occur, for example, when the network is already congested and the UE has been already asked to backoff and thus is running a backoff timer. If it is determined that the backoff timer is running, at block 510 a determination may be made to ignore the received wait time value, after which the process 500 moves to block 516. There may be no need to modify the value of the running backoff timer since the received wait time value may be unprotected (e.g., received in unsecured mode). The UE may ignore the received wait time value when the wait time value is security protected or unprotected and simply rely on the already running backoff timer. (In certain cases if the timer value is protected and if a timer is already running, the UE may stop the timer and restart the timer with the new received value which is integrity protected.)

If it is determined that the backoff timer is not running, at decision block 512 it may be determined whether any other additional (e.g., predetermined) criteria associated with handling the received wait time are satisfied. For example, one such criterion may be that the UE is a low-priority device (e.g., MTC device). In an embodiment, a determination regarding the device priority may be made based on a priority indicator included in the initial communication of the UE (e.g., RRC Connection Request). In other examples, the UE communications such as an attach request message, tracking area update request message, location updating request message, routing area update request message, or service request message may each include a priority indicator (e.g., low priority indicator). Other criteria may include determining procedures already running on the device, such as, for example, attach, tracking area updating, location updating, or service request procedure. If any of these procedures are ongoing, the wait time received from the network may need to be handled.

If at block 512 it is determined that the additional predetermined criteria are not satisfied, the process moves to block 510, where the received wait time value may be ignored. For example, in the instance of the release of the NAS signaling connection (i.e., when RRC connection is released by the network), when no attach, tracking area updating, or service request procedure is ongoing, the UE may ignore the extended wait time value provided by the network.

If at block 512 it is determined that the additional predetermined criteria are satisfied (e.g., the mobile device is determined to be a low-priority device), at block 514 the backoff timer is started with the received wait time value. (In different situations different criteria may apply. For example, the above-described example may be applicable to both low priority and normal and other priority class such as emergency class and Access Class (AC) 11-15 devices as well, depending on how the network system is configured by the operator.)

At decision block 516 it may be determined whether the running backoff timer has expired. If the backoff timer is determined to still be running, the process 500 moves back to block 516. Once it is determined that the backoff timer has expired, at block 518 the communication may be resent to the network server or a different communication may be initiated.

In some embodiments, a signaling procedure for a release of a NAS signaling connection may be initiated by the network. If the UE receives the EWT from lower layers and the NAS signaling connection was previously established with an RRC establishment cause set to "Delay tolerant" then: if a backoff timer is not running, the UE may start the backoff timer with the EWT value provided by the lower layers; and if the backoff timer is running, the UE may ignore the EWT provided by the lower layers.

If the UE receives the EWT from the lower layers and the NAS signaling connection was previously established with an RRC establishment cause not set to "Delay tolerant" then the UE may ignore the EWT provided by the lower layers.

In some embodiments, if an RRC establishment cause provided to lower layers to set up a NAS signaling connection was set to "Delay tolerant", the UE may start the backoff timer with the EWT value. If the RRC establishment cause provided to the lower layers to set up the NAS signaling connection was not set to "Delay tolerant", the UE may ignore the "Extended wait time." In such cases, the UE may abort the attach procedure, reset the attach attempt counter, stay in the current serving cell, change state to an attempting-to-attach/update state, and apply the normal cell reselection process.

Figure 6:
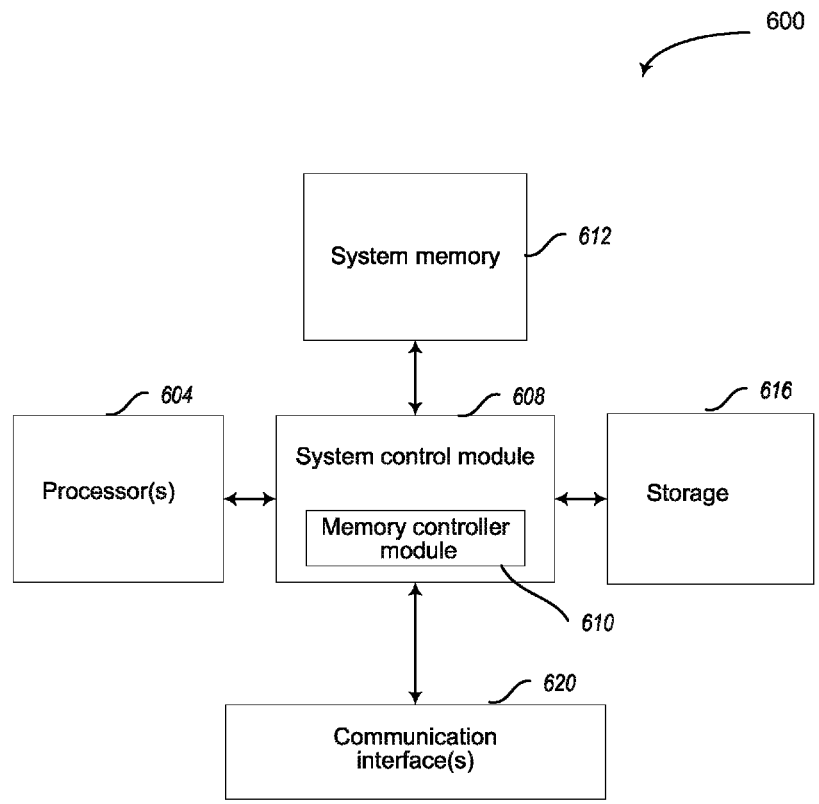
FIG. 6 illustrates an example system that may be used to practice various embodiments described herein.

Embodiments of the present disclosure may be implemented into a system using any suitable hardware and/or software to configure as desired. FIG. 6 schematically illustrates an example system that may be used to practice various embodiments described herein. FIG. 6 illustrates, for one embodiment, an example system 600 having one or more processor(s) 604, system control module 608 coupled to at least one of the processor(s) 604, system memory 612 coupled to system control module 608, non-volatile memory (NVM)/storage 616 coupled to system control module 608, and one or more communications interface(s) 620 coupled to system control module 608.

In some embodiments, the system 600 may be capable of functioning as the UE 15 as described herein. In other embodiments, the system 600 may be capable of functioning as the one or more nodes 45 or one or more servers 50 of FIG. 1 or otherwise provide logic/module that performs functions as described for eNB 40, 42 and/or other modules described herein. In some embodiments, the system 600 may include one or more computer-readable media (e.g., system memory or NVM/storage 616) having instructions and one or more processors (e.g., processor(s) 604) coupled with the one or more computer-readable media and configured to execute the instructions to implement a module to perform actions described herein.

System control module 608 for one embodiment may include any suitable interface controllers to provide for any suitable interface to at least one of the processor(s) 604 and/or to any suitable device or component in communication with system control module 608.

System control module 608 may include memory controller module 610 to provide an interface to system memory 612. The memory controller module 610 may be a hardware module, a software module, and/or a firmware module.

System memory 612 may be used to load and store data and/or instructions, for example, for system 600. System memory 612 for one embodiment may include any suitable volatile memory, such as suitable DRAM, for example. In some embodiments, the system memory 612 may include double data rate type four synchronous dynamic random-access memory (DDR4 SDRAM).

System control module 608 for one embodiment may include one or more input/output (I/O) controller(s) to provide an interface to NVM/storage 616 and communications interface(s) 620.

The NVM/storage 616 may be used to store data and/or instructions, for example. NVM/storage 616 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s), for example.

The NVM/storage 616 may include a storage resource physically part of a device on which the system 600 is installed or it may be accessible by, but not necessarily a part of, the device. For example, the NVM/storage 616 may be accessed over a network via the communications interface(s) 620.

Communications interface(s) 620 may provide an interface for system 600 to communicate over one or more network(s) and/or with any other suitable device. The system 600 may wirelessly communicate with the one or more components of the wireless network in accordance with any of one or more wireless network standards and/or protocols.

For one embodiment, at least one of the processor(s) 604 may be packaged together with logic for one or more controller(s) of system control module 608, e.g., memory controller module 610. For one embodiment, at least one of the processor(s) 604 may be packaged together with logic for one or more controllers of system control module 608 to form a System in Package (SiP). For one embodiment, at least one of the processor(s) 604 may be integrated on the same die with logic for one or more controller(s) of system control module 608. For one embodiment, at least one of the processor(s) 604 may be integrated on the same die with logic for one or more controller(s) of system control module 608 to form a System on Chip (SoC).

In various embodiments, the system 600 may be, but is not limited to, a server, a workstation, a desktop computing device, or a mobile computing device (e.g., a laptop computing device, a handheld computing device, a tablet, a netbook, etc.). In various embodiments, the system 600 may have more or less components, and/or different architectures. For example, in some embodiments, the system 600 may include one or more of a camera, a keyboard, liquid crystal display (LCD) screen (including touch screen displays), non-volatile memory port, multiple antennas, graphics chip, application-specific integrated circuit (ASIC), and speakers.

According to various embodiments, the present disclosure describes an apparatus comprising one or more computer-readable media having instructions and one or more processors coupled with the one or more computer-readable media and configured to execute the instructions to send a radio resource control (RRC) request message to a network controller; receive, from the network controller, a response message including an extended wait time value; determine, upon receipt of the response message, whether a back-off timer associated with the apparatus is running; and determine whether to start the backoff timer with the received extended wait time value based at least in part on the determination of whether the back-off timer is running.

According to various embodiments, the present disclosure describes a system comprising a network controller configured to receive a radio resource control (RRC) request message over a wireless communication network, determine whether the wireless communication network is congested; and, based on the determination, provide a response message including an extended wait time value in response to the received RRC request message. The system further comprises a device configured to receive, from the network controller, the response message including the extended wait time value, determine, upon receipt of the response message, whether a back-off timer associated with the device is running, and determine whether to start the backoff timer with the received extended wait time value based at least in part on the determination of whether the back-off timer is running.

According to various embodiments, the present disclosure describes a computer-implemented method comprising sending a request message to a network controller, receiving, from the network controller, a response message including an extended wait time value, determining, upon receipt of the response message, whether a back-off timer associated with the apparatus is running, and starting the backoff timer with the received extended wait time value based at least in part on the determining that the back-off timer is running.

According to various embodiments, the present disclosure describes a computer-readable storage medium having instructions stored thereon that, when executed on a computing device, cause the computing device to send a request message to a network controller; receive, from the network controller, a response message including an extended wait time value; determine, upon receipt of the response message, whether a back-off timer associated with the computing device is running; determine whether the request message includes a low priority indication; and start the backoff timer with the received extended wait time value based at least in part on the determining that the back-off timer is running and that the request message includes the low priority indication.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A mobile device comprising:
   one or more non-transitory computer-readable media having instructions; and
   one or more processors coupled with the one or more non-transitory computer-readable media and configured to execute the instructions to cause the mobile device to:
      send a non-access stratum (NAS) signaling message to a network controller, the NAS signaling message to include a location update request, a tracking area update request, or a service request;
      determine whether the NAS signaling message had a low-priority indicator; and
      determine whether to start a backoff timer with an extended wait time (EWT) value based on whether the NAS signaling message had a low-priority indicator, wherein said determine whether to start the backoff timer includes start the backoff timer with the EWT value upon a determination that the NAS signaling message did include a low-priority indicator or ignore the EWT value upon a determination that the NAS signaling message did not include a low-priority indicator.

2. The mobile device of claim 1, wherein the one or more processors are further configured to execute the instructions to:
   receive the EWT value in a radio resource control (RRC) reject message.

3. The mobile device of claim 1, wherein the one or more processors are further configured to execute the instructions to:
   receive the EWT value in a radio resource control (RRC) connection release message.

4. The mobile device of claim 3, wherein the one or more processors are further configured to execute the instructions to:
   receive the EWT value from lower layers.

5. The mobile device of claim 4, wherein the one or more processors are further configured to execute the instructions to:
   determine, upon receipt of the EWT value, whether a backoff timer associated with the mobile device is running; and
   determine whether to start the backoff timer with the received EWT value based at least in part on the determination of whether the back-off timer is running.

6. The mobile device of claim 5, wherein the mobile device comprises a machine type communication (MTC) device.

7. An mobile device comprising:
   one or more non-transitory computer-readable media having instructions; and
   one or more processors coupled with the one or more non-transitory computer-readable media and configured to execute the instructions to cause the mobile device to:
   process a message, received from a network controller, that instructs the mobile device to release a connection, the message to include an extended wait time (EWT) value;
   determine whether a procedure is ongoing; and
   determine whether to start a backoff timer with the EWT value based on the determination of whether a procedure is ongoing,
   wherein the procedure is an attach procedure, a tracking area update procedure, a location update procedure, or a service request procedure; and wherein the one or more processors are configured to ignore the EWT value upon a determination that the EWT value was received when the procedure is not ongoing.

8. The mobile device of claim 7, wherein the procedure is a location update procedure or a service request procedure.

9. The mobile device of claim 8, wherein the one or more processors are configured to:
start the backoff timer with the EWT value upon a determination that the EWT value was received when the procedure is not ongoing.

10. The mobile device of claim 9, wherein the EWT value is received from lower layers.

11. The mobile device of claim 10, wherein the EWT value is received for a circuit-switched domain.

12. The mobile device of claim 11, wherein the mobile device comprises a mobile station having a touchscreen user interface.

13. A computer-implemented method comprising:
sending, by a mobile device, a message to a network controller;
receiving, by the mobile device, an extended wait time value;
determining, by the mobile device, whether the message included a low-priority indicator; and
determining, by the mobile device, whether to start a backoff timer with the received extended wait time value based on the determining of whether the message included a low-priority indicator, wherein said determining whether to start the backoff timer includes starting the backoff timer with the EWT value upon a determination that the NAS signaling message did include a low-priority indicator or ignoring the EWT value upon a determination that the NAS signaling message did not include a low-priority indicator.

14. The method of claim 13, wherein the network controller is associated with a wireless communication network.

15. At least one non-transitory computer-readable storage medium having instructions stored thereon that, when executed on a mobile device, cause the mobile device to:
send a request message to a network controller;
receive, from the network controller, a response message including an extended wait time (EWT) value;
determine whether the request message had a low-priority indicator; and
determine whether to start the backoff timer with the received EWT value based on the determination of whether the request message had a low-priority indictor, wherein said determine whether to start the backoff timer includes start the backoff timer with the EWT value upon a determination that the NAS signaling message did include a low-priority indicator or ignore the EWT value upon a determination that the NAS signaling message did not include a low-priority indicator.

16. The non-transitory computer-readable storage medium of claim 15, wherein the mobile device is a machine-type communication (MTC) device.

17. The non-transitory computer-readable storage medium of claim 16, wherein the network controller is associated with a wireless communication network.

* * * * *

UNITED STATES PATENT AND TRADEMARK OFFICE
CERTIFICATE OF CORRECTION

PATENT NO.         : 9,055,477 B2
APPLICATION NO.    : 13/526302
DATED              : June 9, 2015
INVENTOR(S)        : Vivek Gupta Page 1 of 1

It is certified that error appears in the above-identified patent and that said Letters Patent is hereby corrected as shown below:

In the claims

Column 10

Line 52, "An mobile…" should read --A mobile;…--.

Column 11

Line 11, "…is not ongoing…" should read --…is ongoing…--.

Signed and Sealed this
Fourteenth Day of June, 2016

Michelle K. Lee
*Director of the United States Patent and Trademark Office*